United States Patent
Yang

(10) Patent No.: US 11,864,272 B2
(45) Date of Patent: *Jan. 2, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/474,990

(22) Filed: Sep. 14, 2021

(65) Prior Publication Data

US 2021/0409938 A1  Dec. 30, 2021

Related U.S. Application Data

(63) Continuation of application No. 16/347,621, filed as application No. PCT/CN2016/105436 on Nov. 11, 2016, now Pat. No. 11,140,544.

(51) Int. Cl.
*H04W 8/24* (2009.01)
*H04W 16/02* (2009.01)

(52) U.S. Cl.
CPC ........... *H04W 8/245* (2013.01); *H04W 16/02* (2013.01)

(58) Field of Classification Search
CPC ..... H04W 8/245; H04W 16/02; H04W 40/12; H04W 60/00; H04W 48/18; H04W 36/00;
(Continued)

(56) References Cited

U.S. PATENT DOCUMENTS

| 11,140,544 B2* | 10/2021 | Yang | H04W 8/245 |
| 2013/0005391 A1* | 1/2013 | Niass | H04W 48/18 |
| | | | 455/525 |

(Continued)

FOREIGN PATENT DOCUMENTS

| CN | 105516312 A | 4/2016 |
| CN | 105898894 A | 8/2016 |

OTHER PUBLICATIONS

Motorola et al., "Interim Agreement: Determination of NSSAI based on UE policy," 3GPP Draft, S2-166603, vol. SA WG2, No. Reno, Nevada, Nov. 8, 2016, pp. 1-3. (Year: 2016).*

(Continued)

*Primary Examiner* — Donald L Mills
(74) *Attorney, Agent, or Firm* — Hodgson Russ LLP

(57) ABSTRACT

Disclosed in embodiments of the present invention are a wireless communication method, a network device, and a terminal device. The method comprises: a first device receives network slice information sent by a second device, wherein the network slice information is to indicate multiple network slices; the first device determines a target network slice from the multiple network slices, the target network slice comprising at least one network slice supported by the first device; and the first device performs wireless communication according to the target network slice.

12 Claims, 3 Drawing Sheets

---

200

First device receiving network slice information sent by a second device, wherein the network slice information is to indicate multiple network slices — S210

First device determining a target network slice from the multiple network slices according to the network slice information, the target network slice comprising at least one network slice supported by the first device — S220

First device performing wireless communication according to the target network slice — S230

(58) Field of Classification Search
CPC . H04W 36/0011; H04W 36/30; H04W 36/34; H04L 47/24
See application file for complete search history.

(56) References Cited

U.S. PATENT DOCUMENTS

| | | |
|---|---|---|
| 2019/0230584 A1* | 7/2019 | Lou .................. H04W 48/16 |
| 2019/0261187 A1* | 8/2019 | Chen .................. H04W 24/10 |
| 2019/0261233 A1* | 8/2019 | Duan .................. H04W 36/14 |
| 2020/0059987 A1* | 2/2020 | Hong ............... H04W 36/0072 |

OTHER PUBLICATIONS

Apple, "A Solution of Network Slice Selection and Association," S2-164599, SA WG2 Meeting, Aug. 29, 2016, pp. 1-6. (Year: 2016).*
CNIPO, First Office Action for CN App. No. 202110041043.4, dated Jun. 10, 2022.
EPO, Office Action for EP Application No. 20183931.3, dated Oct. 28, 2022.
CNIPA, Office Action For CN Application No. 202110041042.X, dated Dec. 28, 2022.
CNIPA, First Office Action for CN Application No. 202110041042.X, dated Jul. 29, 2022.
Huawei, "Key principles for support of network slicing in RAN," Ran WG2 Meeting #95, R2-165019, Aug. 2016.
CNIPA, Notification to Grant Patent Right for Invention for CN Application No. 202110041042.X, dated Mar. 26, 2023.
KIPO, Office Action for KR Application No. 10-2019-7016024, dated May 30, 2023.

\* cited by examiner

WIRELESS COMMUNICATION METHOD, TERMINAL DEVICE, AND NETWORK DEVICE

CROSS REFERENCE

The present application is a continuation of U.S. application Ser. No. 16/347,621, filed May 6, 2019, which is a U.S. National Stage Entry of International Application No. PCT/CN2016/105436, filed Nov. 11, 2016, the entire disclosures of which are incorporated herein by reference.

TECHNICAL FIELD

The present disclosure relates to the field of communications, and in particular, to a wireless communication method, a terminal device and a network device.

BACKGROUND

With the development of wireless network communication technology, the demand for wireless communication services is gradually increasing, showing a diversified trend. In an existing wireless communication system, in addition to the ordinary voice and data services between people, the Internet of Things business has gradually become an inseparable part of the wireless communication service. In the future, with the development of the Internet of Things and the Industrial Internet, more and more diverse terminals will access the network and use some or all of capabilities and resources of the access network to serve them. Therefore, in the research of wireless network communication technology, researchers introduce the concept of network slicing, which is to make functions of the network (including a core network and an access network) modular, so that different terminals use customized network functions for different business needs.

It should be noted that the information disclosed in the background section above is only for enhancing the understanding of the background of the present disclosure, and thus may include information that does not constitute prior art known to those of ordinary skill in the art.

SUMMARY

The embodiments of the present disclosure provide a wireless communication method, a terminal device and a network device.

In one aspect, a wireless communication method is provided, including: a first device receiving network slice information sent by a second device, the network slice information being configured to indicate multiple network slices; the first device determining a target network slice from the multiple network slices according to the network slice information, the target network slice including at least one network slice supported by the first device; and the first device performing wireless communication according to the target network slice.

Optionally, when the first device is a terminal device and the second device is a network device, the network slice information is configured to indicate multiple network slices supported by the network device, and the target network slice is supported by both the first terminal device and the second device.

Optionally, when the first device is a network device and the second device is a terminal device, the network slice information is configured to indicate multiple network slices supported by the terminal device.

In a possible implementation, the method further includes: the first device acquiring first priority information and/or second priority information, wherein the first priority information is configured to indicate a sequence of processing network slices supported by the second device from the multiple network slices by the second device, the second priority information is configured to indicate a sequence of processing network slices supported by the first device; wherein the first device determining a target network slice from the multiple network slices according to the network slice information includes: the first device determining the target network slice from the multiple network slices according to the first priority information and/or the second priority information.

Optionally, the first device may select a network slice with the highest priority from the network slices processed by two ends of the communication device, to perform communication.

In a possible implementation, the network slice information includes the first priority information, and the first device acquiring the first priority information includes: the first device acquiring the first priority information from the network slice information.

In a possible implementation, the first device is a terminal device, the second device is a network device, and the first device performing wireless communication according to the target network slice includes: the terminal device accessing the network device according to the target network slice; and/or the terminal device residing in a cell to which the target network slice belongs according to the target network slice.

Optionally, the first device is a network device, the second device is a terminal device, and the first device performing wireless communication according to the target network slice includes: the network device performing resource configuration for the terminal device according to the target network slice; and/or the network device triggering handover or redirection of the terminal device to a cell to which the target network slice belongs according to the target network slice.

In a possible implementation manner, the terminal device residing in a cell to which the target network slice belongs according to the target network slice includes: the terminal device residing in a cell to which the target network slice belongs according to the target network slice, when determining that a network slice with highest priority from network slices supported by the network device and processed by the network device and a network slice with highest priority from network slices supported by the terminal device and processed by the terminal device are identical.

Optionally, when the terminal device determines that a network slice with highest priority from network slices supported by the network device and a network slice with highest priority from network slices supported by the terminal device are different, the terminal device selects a cell under another network device by means of reselection for residing.

In a possible implementation manner, the network slice information further includes a probability of the terminal device to access each of the multiple network slices, the terminal device accessing the network device according to the target network slice includes: the terminal device accessing the network device according to a probability of a service of the terminal device to access the target network slice.

In a possible implementation manner, the first device is an access network device, the second device is a terminal device, and the first device acquiring first priority information includes: the access network device receiving the first priority information authenticated by a core network device and sent by the terminal device.

In a possible implementation, the first device is an access network device and the second device is a terminal device, the method further includes: the access network device sending the first priority information to a core network device when determining that the first priority information needs to be authenticated; the access network device receiving an acknowledgement message of the priority information sent by the core network device.

Optionally, the terminal device sends the priority information to the core network device by using the signaling of an access layer or a non-access stratum, and the core network device feeds back to the access network device after completing the verification and confirmation.

Optionally, the terminal device sends the priority information to the access network device directly through the access layer, and if necessary, the access network device forwards the information to the core network device for verification and confirmation.

In one aspect, a wireless communication method is provided, including: a second device determining network slice information, wherein the network slice information is configured to indicate multiple network slices; the second device sending the network slice information to a first device.

In a possible implementation, n the method further includes: the second device sending first priority information to the first device, wherein the first priority information is configured to indicate a sequence of processing network slices supported by the second device from the multiple network slices by the second device.

In a possible implementation manner, the second device is a terminal device, the first device is a network device, and the method further includes: the terminal device updating the first priority information according to a service requirement of the terminal device.

In a possible implementation, the second device is a terminal device and the first device is an access network device, and the second device sending first priority information to the first device includes: the terminal device sending the first priority information authenticated by a core network device to the access network device.

In one aspect, a device is provided for performing the method of the aspect or any possible implementation of the aspect described above. In particular, the device includes units for performing the method of the aspect or any possible implementation of the aspect described above.

In one aspect, a device is provided for performing the method of the aspect or any possible implementation of the aspect described above. In particular, the device includes units for performing the method of the aspect or any possible implementation of the aspect described above.

In one aspect, a device is provided, including: a memory, a processor, a transceiver, a communication interface, and a bus system. The memory, the processor and the transceiver are connected by a bus system. The memory is used for storing instructions, the processor is used for executing instructions stored in the memory. The processor executes the method of the above aspect when the instruction is executed, and controls the transceiver to receive input data and information, and outputs data such as operation results.

In one aspect, a device is provided, including: a memory, a processor, a transceiver, a communication interface, and a bus system. The memory, the processor and the transceiver are connected by a bus system. The memory is used for storing instructions, the processor is used for executing instructions stored in the memory. The processor executes the method of the above aspect when the instruction is executed, and controls the transceiver to receive input data and information, and outputs data such as operation results.

In one aspect, a computer storage medium is provided, for storing computer software instructions for use in the above method, including a program designed to perform the above aspects.

In the present application, names of the terminal device, the access network device and the core network device are not limited to the device itself. In actual implementation, these devices may appear under other names. As long as functions of the respective devices are similar to the present disclosure, they are within the scope of the claims and the equivalents thereof.

These and other aspects of the present application will be more readily apparent in the following description of the embodiments.

It should be understood that the above general description and the following detailed description are merely exemplary and explanatory, and are not limiting of the present disclosure.

It should be understood that the above general description and the following detailed description are merely exemplary and explanatory, and are not limiting of the present disclosure.

DETAILED DESCRIPTION

Figure 1:
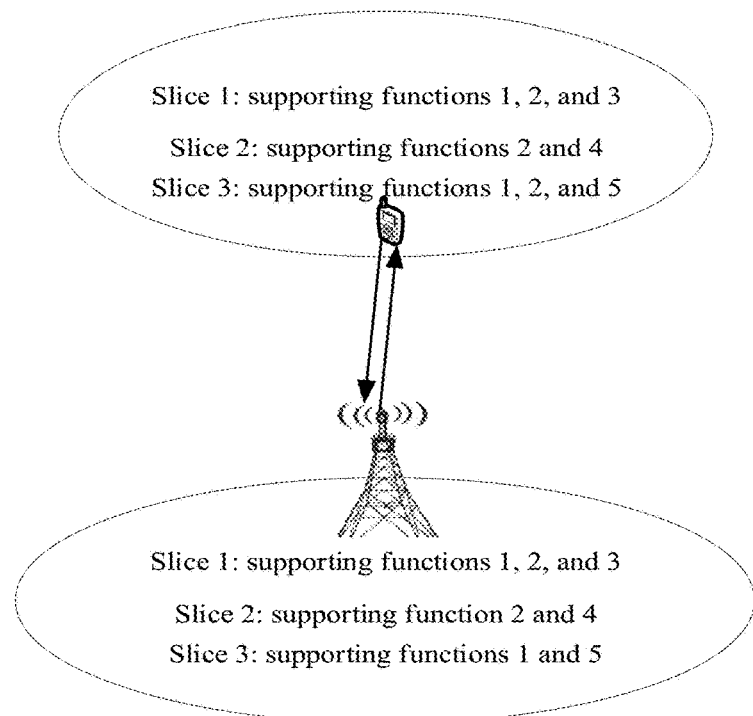
FIG. 1 is a schematic diagram of a possible application scenario of an embodiment of the present disclosure.

The technical solutions in the embodiments of the present disclosure will be clearly and completely described in the following with reference to the accompanying drawings.

It should be understood that the technical solutions of the embodiments of the present disclosure can be applied to various communication systems, for example, the Global System of Mobile communication ("GSM") system, Code Division Multiple Access ("CDMA") system, Wideband Code Division Multiple Access ("WCDMA") system, General Packet Radio Service ("GPRS"), Long Term Evolution ("LTE") system, LTE Frequency Division Duplex ("FDD") system, LTE Time Division Duplex ("TDD"), Universal Mobile Telecommunication System ("UMTS") or Worldwide Interoperability for Microwave Access ("WiMAX") communication system, or future 5G system.

In particular, the technical solution of the embodiments of the present disclosure can be applied to various communication systems based on non-orthogonal multiple access technologies, such as Sparse Code Multiple Access ("SCMA") system, and Low Density Signature ("LDS") system, etc., Of course, the SCMA system and the LDS system may also be referred to as other names in the field of communication. Further, the technical solution of the embodiments of the present disclosure may be applied to Multi-carrier transmission system which adopts non-orthogonal multiple access technology, for example, adopting Orthogonal Frequency Division Multiplexing ("OFDM"), Filter Bank Multi-Carrier ("FBMC"), Generalized Frequency Division Multiplexing ("GFDM"), and Filtered-OFDM ("F-OFDM") system or the like.

The terminal device in the embodiment of the present disclosure may refer to User Equipment (UE), an access terminal, a subscriber unit, a subscriber station, a mobile station, a mobile station, a remote station, a remote terminal, a mobile device, a user terminal, a terminal, and a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device or a computing device with wireless communication functions or other processing devices connected to wireless modems, an in-vehicle device, a wearable device, a terminal device in the future 5G network or a terminal device in the future evolved Public Land Mobile Network (PLMN) and the like, which are not limited in the embodiment of the present disclosure.

The network device in the embodiment of the present disclosure may be a device for communicating with a terminal device, where the network device may be a base station (Base Transceiver Station, BTS) in GSM or CDMA, or a base station (NodeB, NB) in a WCDMA system, or an evolved base station (Evolutional NodeB, eNB or eNodeB) in the LTE system, or a wireless controller in a Cloud Radio Access Network (CRAN) scenario, or the network device may be a relay station, an access point, an in-vehicle device, a wearable device, and a network device in a future 5G network or a network device in a future evolved PLMN network, which is not limited by the embodiment of the present disclosure.

FIG. 1 is a schematic diagram of an application scenario of an embodiment of the present disclosure. The communication system in FIG. 1 may include a terminal device 10 and a network device 20. The network device 20 is configured to provide communication services for the terminal device 10 and access a core network. The terminal device 10 accesses the network by searching for synchronization signals, broadcast signals, and the like transmitted by the network device 20, thereby performing communication with the network. The arrows shown in FIG. 1 may represent uplink/downlink transmissions through a cellular link between the terminal device 10 and the network device 20.

In the embodiment, the network device 20 supports Slice 1, Slice 2, and Slice 3, and the terminal device 10 supports Slice 1, Slice 2, and Slice 4.

A slice herein refers to a set of network functions (including core network functions and/or access network functions), and any other description having the same function has an equivalent effect.

In the future, logically, each network slice represents a type of service requirement of a certain type of terminal device. The network device selects a corresponding network function to match a service according to service requirements of the terminal device, and forms a corresponding slice.

The most ideal way is to dynamically combine the functions of the core network device and/or the access network device according to the service requirements of the terminal device, and then make configuration for the terminal device. For example, if a physical network terminal device needs to be sent by a small packet, it needs to configure or activate a random access function and a recovery function for the network; as for a terminal device that supports a licensed-assisted access (LAA), LAA functions may be configured or activated for the network if necessary. However, complexity of the network configuration in this manner is high, and the implementation is quite cumbersome. The simplified solution is that the network device forms multiple matching slices in advance according to the type of the terminal and the type of the service, and when the terminal device needs to use the corresponding slice, the requirement is sent to the network device, and then the network device configures the resources to the terminal device according to the corresponding slice requirement.

In a network configuration process, although multiple network slices can be supported at the same time, it need to solve the problem that how to handle the residing and access of different slice terminals supporting different slice under the limited resource. At the same time, the terminal device may simultaneously support multiple network slices, the terminal also needs to choose to use which network slice for residing and access, and let the network device learn about its own idea with respect to different network slices, so that the network device can select corresponding resources for itself better.

Figure 2:
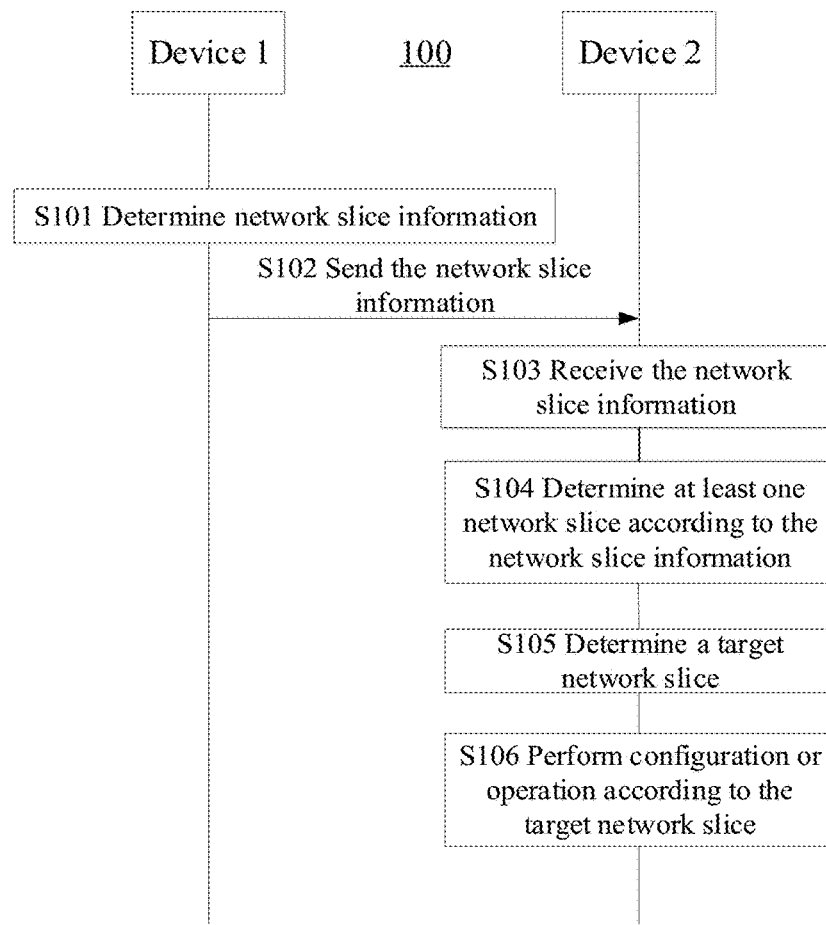
FIG. 2 is a flow chart showing a wireless communication method in accordance with an embodiment of the present disclosure.

For convenience of description, the flow of the wireless communication method 100 according to an embodiment of the present disclosure will be briefly described firstly with reference to FIG. 2. As shown in FIG. 2, the method 100 includes following steps.

In step S101, a device 1 determines network slice information, wherein the network slice information is configured to indicate multiple network slices.

S102, the device 1 sends the network slice information to a device 2.

S103, the device 2 receives the network slice information sent by the device 1.

S104, the device 1 determines, according to the network slice information, at least one network slice supported by the device 2 from the multiple network slices.

S105, the device 1 determines a target network slice from the at least one network slice determined in S103.

S106, the device 1 performs configuration or operation according to the target network slice.

It should be noted that the device 1 herein may be a terminal device or a network device; the device 2 may be a terminal device or a network device. For convenience of description, the following describes the interaction between the terminal device and the network device as an example.

The network slice information herein may include slice information of multiple network slices, for example, functions supported by each network slice, a cell to which each network slice belongs, a probability that the terminal device accesses each network slice, an identifier of each network slice, and priority of multiple network slices, and other information. The network slice information herein may be configured to indicate multiple network slices supported by the device 1, and may also include network slices supported by other devices. For example, the network device 1 sends multiple network slices supported by the network device 1 to the terminal device, and may also send network slices supported by neighboring network devices to assist the terminal device to perform reselection.

The configuration or operation herein may be the behavior of the terminal device or the network device, such as the terminal device residing in a cell, the terminal device accessing the network device, or terminal device handing-over a cell.

The target network slice herein can be one or more network slices.

Therefore, through the wireless communication method in the embodiments of the present disclosure, by learning about network slice information of a peer end, the condition of multiple network slices sent by the peer end can be learnt about; and accordingly, a target network slice can be better selected to perform wireless communication, so as to improve the quality of the wireless communication.

Figure 3:
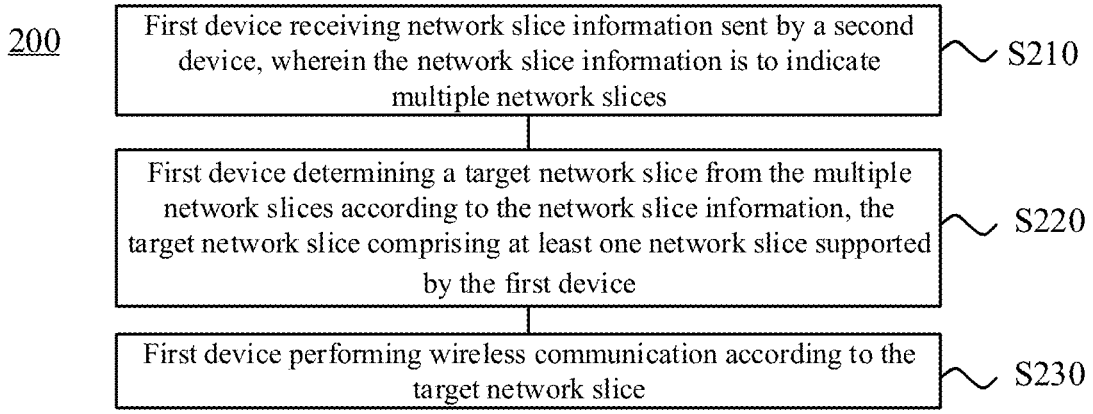
FIG. 3 shows a schematic block diagram of a wireless communication method in accordance with an embodiment of the present disclosure.
Figure 4:
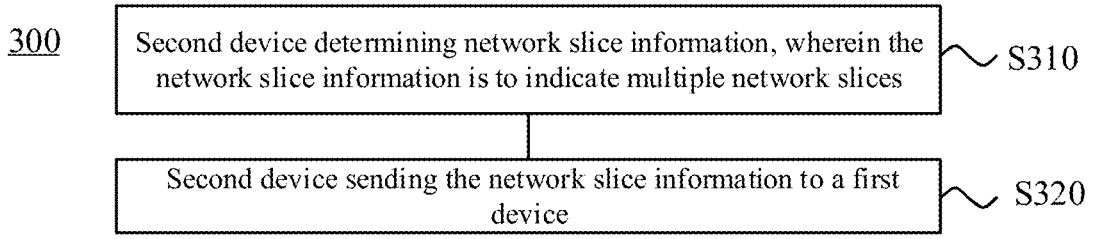
FIG. 4 shows another schematic block diagram of a wireless communication method in accordance with an embodiment of the present disclosure.

A wireless communication method according to an embodiment of the present disclosure will be separately described from the perspective of both ends of the communication device, respectively, in conjunction with FIGS. 3 and 4.

FIG. 3 shows a schematic block diagram of a wireless communication method 200 in accordance with an embodiment of the present disclosure. As shown in FIG. 3, the method 200 includes:

S210, a first device receiving network slice information sent by a second device, the network slice information being configured to indicate multiple network slices;

S220, the first device determining a target network slice from the multiple network slices according to the network slice information, the target network slice including at least one network slice supported by the first device; and S230, the first device performing wireless communication according to the target network slice.

It should be understood that the first device performing wireless communication may be communicating with the second device, or may be communicating with other devices except the second device. For example, the network slice information includes information of network slices supported by other devices. The first device selects the target network slice to perform wireless communication with other devices.

In an embodiment, the first device is a terminal device, and the second device is a network device. The network device may broadcast the slice information of multiple network slices to multiple terminal devices. After the terminal device receives the slice information of multiple network slices sent by the network device, the terminal device selects at least one network slice supported by itself from the multiple network slices, and then the terminal device determines a target network slice from the selected at least one network slice, thereby accessing the network device according to the target network slice or residing in a cell of the target network slice. For example, if the network slice information received by the terminal device includes slice information of Slice1, Slice2, Slice3, Slice4, and Slice5 while the terminal device supports Slice1, Slice2, and Slice6, at least one network slice selected by the terminal device may be Slice1 and Slice2. If the terminal device processes Slice1 with a priority higher than Slice2, the terminal device selects Slice1 from Slice1 and Slice2 as the target network slice.

In another embodiment, the first device is a network device, and the second device is a terminal device. The terminal device may send, to the network device, slice information of multiple network slices. After the network device receives the slice information of the multiple network slices sent by the terminal device, the network device selects at least one network slice supported by itself from the multiple network slices, and then the network device determines a target network slice from the selected at least one network slice, thereby configuring or selecting a cell to handover or reside for the terminal device according to the target network slice. For example, if the network slice information received by the network device includes slice information of Slice1, Slice2, Slice3, Slice4, and Slice5 while the network device supports Slice1, Slice2, and Slice6, at least one network slice selected by the network device may be Slice1 and Slice2. If the network device processes Slice1 with a priority higher than Slice2, the network device selects Slice1 from Slice1 and Slice2 as the target network slice.

Optionally, in the embodiment of the present disclosure, the method further includes: the first device acquiring first priority information and/or second priority information, wherein the first priority information is configured to indicate a sequence of processing network slices supported by the second device from the multiple network slices by the second device, the second priority information is configured to indicate a sequence of processing network slices supported by the first device; wherein the first device determining a target network slice from the multiple network slices according to the network slice information includes: the first device determining the target network slice from the multiple network slices according to the first priority information and/or the second priority information.

For example, the network device sends priority information of the network slice supported by five network devices Slice1, Slice2, Slice3, Slice4, and Slice5 to the terminal device, such as Slice1>Slice2>Slice3>Slice4>Slice5. The terminal device supports three network slices Slice1, Slice2 and Slice3, and Slice1<Slice3<Slice2. The terminal device can select the network slice Slice1 that is most preferentially processed by the network device from Slice1, Slice2, and Slice3. The terminal device can also select the network slice Slice2 that is most preferentially processed by the terminal device from Slice1, Slice2, and Slice3. The terminal device may also select the first two network slices Slice1 and Slice2 that are preferentially processed by the network device from Slice1, Slice2, and Slice3. The terminal device may also select the first two network slices Slice2 and Slice3 that are preferentially processed by the terminal device from Slice1, Slice2, and Slice3. The terminal device may also select Slice2 that is preferentially processed by both the network device and the terminal device. The terminal device may process the priority of the multiple network slices according to the network device, and/or the terminal device handles the priority of multiple network devices to determine the target network slice. The target network slice can be either one or more. The present disclosure is not limited thereto.

It should be understood that the first priority information and the second priority information of the embodiment of the present disclosure may be pre-configured by the network device and/or the terminal device, or may also be determined by the network device and/or the terminal device according to a service state in a period of time. The manner of determining the priority information is not limited in the embodiment of the present disclosure.

In addition, the first priority information and/or the second priority information herein may be associated with the network slice feature. For example, the priority of the corresponding network slice may be determined according to the identifier and priority information of the network slice. For example, the network slice supporting the function 1, function 2, and function 3 is identified as Slice1, and the network slice supporting the function 2, function 3, and function 4 is identified as Slice2. If the priority of the function 1 is greater than that of function 2, much greater than that of function 3, and further much greater than that of function 4, it can be determined that the priority of Slice1 is higher than that of Slice2.

It should also be understood that the network slice supported by the first device herein may refer to a part of network slices including the target network slice, or may refer to all network slices supported by the first device; and the network slice supported by the second device herein may refer to a part of network slices including the target network slice, or may also refer to all network slices supported by the second device.

Optionally, in the embodiment of the present disclosure, the network slice information includes the first priority information, and the first device acquiring the first priority information includes: the first device acquiring the first priority information from the network slice information.

Optionally, in the embodiment of the present disclosure, the terminal device residing in a cell to which the target network slice belongs according to the target network slice includes: the terminal device residing in a cell to which the target network slice belongs according to the target network slice, when determining that a network slice with highest priority from network slices supported by the network device and processed by the network device and a network slice with highest priority from network slices supported by the terminal device and processed by the terminal device are identical.

Optionally, in the embodiment of the present disclosure, the network slice information further includes a probability of the terminal device to access each of the multiple network slices, the terminal device accessing the network device according to the target network slice includes: the terminal device accessing the network device according to a probability of a service of the terminal device to access the target network slice.

Optional, the access network device receiving the first priority information authenticated by a core network device and sent by the terminal device, and/or the method 200 further includes: the access network device sending the first priority information to a core network device when determining that the first priority information needs to be authenticated; the access network device receiving an acknowledgement message of the priority information sent by the core network device.

Optionally, the terminal device may send the priority information to the core network device by using the signaling of an access layer or a non-access stratum, and the core network device feeds back to the access network device after completing the verification and confirmation. The terminal device may also send the priority information to the access network device directly through the access layer, and if necessary, the access network device forwards the information to the core network device for verification and confirmation.

FIG. 4 shows a schematic block diagram of a wireless communication method 300 in accordance with an embodiment of the present disclosure. As shown in FIG. 4, the method 300 includes:

S310, a second device determining network slice information, wherein the network slice information is configured to indicate multiple network slices;

S320, the second device sending the network slice information to a first device.

Optionally, in the embodiment of the present disclosure, the method further includes: the second device sending first priority information to the first device, wherein the first priority information is configured to indicate a sequence of processing network slices supported by the second device from the multiple network slices by the second device.

Optionally, in the embodiment of the present disclosure, the second device is a terminal device, the first device is a network device, and the method further includes: the terminal device updating the first priority information according to a service requirement of the terminal device.

For example, the terminal device supports Slice1, Slice2, and Slice3. If a current service of the terminal device is function 1 and only Slice1 supports the function 1, the terminal device may preferentially select Slice1 to access the network device. If the current service of the terminal device is updated to a function 2 and only Slice 2 supports the function 2, the terminal device can preferentially select Slice 2 to access the network device.

Optionally, in the embodiment of the present disclosure, the second device is a terminal device and the first device is an access network device, and the second device sending first priority information to the first device includes: the terminal device sending the first priority information authenticated by a core network device to the access network device.

It is to be understood that the various examples described above are merely illustrative and are not intended to limit the scope of the embodiments of the disclosure.

The priority and its use of network slices in the embodiment of the present disclosure are described in detail below with reference to two embodiments.

Embodiment 1: Priority and Use of Cell Network Slices

In order to solve the access problem of terminals with different network slicing capabilities in the cell, the network device broadcasts the slice priority to the terminal, to indicate the slice capability of preferentially accessing and processing in the cell, which includes the terminal residing priority, such as the terminal with the slice capability 1 preferentially residing in the cell 1; may also include the terminal slice access probability, that is, the terminal initiating the access according to a certain probability when accessing the terminal. When the terminal uses different slice capabilities to access, the terminal may preferentially select corresponding network slice resources for access according to its own slice capability.

An idle state operation: when the terminal initially resides, the terminal selects a first cell that can be accessed to reside, and meanwhile receives information such as slice information (slice identifier, slice priority) sent by the cell. When the slice priority sent by the cell does not match the slice function of the terminal (for example, the cell slice priority is to preferentially process enhanced mobile broadband services, and the terminal slice priority is to preferentially process massive low-power connection services), other cells are selected to reside through reselection. The cell accessed at this time can send slice information of neighboring cells, to assist the terminal to perform reselection.

A connection state operation: when the terminal initiates initial access of a certain slice, the terminal may access according to information such as an access probability of a corresponding slice included in the slice information. When the function that the terminal wants to start can be completed by multiple slices (for example, the packet transmission can be completed through enhanced mobile broadband or through massive low-power connection), a corresponding slice with the highest priority is selected to complete the access.

Embodiment 2: Terminal Slice Priority and Use of the Terminal

The terminal initiates the corresponding slice priority according to its own capabilities and/or service requirements, and performs idle state network residing according to the priority. Under a connected state, by notifying the network of the network priority information, it may assist the network to perform handing-over towards the terminal.

An idle state operation: when the terminal resides in the idle state, considering the network slicing function possessed by multiple cells and its own terminal slicing function priority, it is preferably to select a cell to which the slicing function with high priority belongs to reside. For example, a network cell A supports slices 1, 2, a network cell B supports slices 2, 3, the terminal supports slices 1, 2, and the slice 1 has higher priority, then the terminal preferentially resides in the network cell A. If the terminal only supports slice 2, it is feasible to reside in either cell A or cell B.

A connection state operation: when the terminal performs handing-over in the connected state, the network preferably selects the cell to which the slice function with high priority belongs for handing-over, according to the slice function priority reported by the terminal. For example, network cells A and B are both target cells for handing-over, wherein the network cell A supports slices 1, 2, the network cell B supports slices 2, 3, the terminal supports slices 1, 3, and the slice 1 has higher priority, then the network may preferentially handover the terminal to the network cell A. If the terminal only supports the slice 2, it is feasible to handover to either cell A or cell B.

Therefore, in the wireless communication method in the embodiment of the present disclosure, it enables the terminal to select the most suitable access point for access by notifying information of different network slices of the peer end and the processing priority for different network slices. In addition, it enables the network to learn about the slice priority of the terminal when supporting multiple slice functions, so as to better match the terminal residing, access and handing-over behavior, and improve experience of end users.

In addition, in the foregoing method embodiments, steps on the terminal device side may be separately implemented as the wireless communication method on the terminal device side, and steps on the network device side may be separately implemented as the wireless communication method on the network device side. In each of the foregoing method embodiments, the network device is usually a base station, and the terminal device is usually user equipment.

It should be understood that the interaction between the network device and the terminal device, the related features and functions at the network device are corresponding to the related features and functions at the terminal device side. For brevity, details are not repeated herein.

It should also be understood that, in various embodiments of the present disclosure, the sequence numbers of the above processes do not imply a sequence of executions, and an execution order of the processes should be determined by its function and internal logic, but should not be make any limitation on implementation of embodiments of the present disclosure.

The wireless communication method according to an embodiment of the present disclosure is described in detail above. Hereinafter, a wireless communication device according to an embodiment of the present disclosure will be described with reference to FIG. 5 to FIG. 8. The technical features described in the method embodiments are applicable to the following device embodiments.

Figure 5:
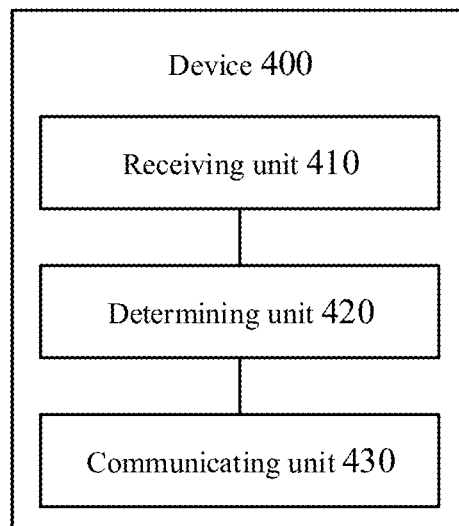
FIG. 5 shows a schematic block diagram of a wireless communication device in accordance with an embodiment of the present disclosure.

FIG. 5 shows a wireless communication device 400 in accordance with an embodiment of the present disclosure. As shown in FIG. 5, the device is a first device, and the device 400 includes:
   a receiving unit 410, configured to receive network slice information sent by a second device, the network slice information being configured to indicate multiple network slices;
   a determining unit 420, configured to determine a target network slice from the multiple network slices according to the network slice information, the target network slice including at least one network slice supported by the first device;
   a communicating unit 430, configured to perform wireless communication according to the target network slice.

Therefore, in the wireless communication device in the embodiments of the present disclosure, by learning about network slice information of a peer end, the condition of multiple network slices sent by the peer end can be learnt about; and accordingly, a target network slice can be better selected to perform wireless communication, so as to improve the quality of the wireless communication.

Optionally, in the embodiment of the present disclosure, the device further includes:
   an acquiring unit 440, configured to acquire first priority information and/or second priority information, wherein the first priority information is configured to indicate a sequence of processing network slices supported by the second device from the multiple network slices by the second device, the second priority information is configured to indicate a sequence of processing network slices supported by the first device;
   the determining unit 420 is configured to:
   determine the target network slice from the multiple network slices according to the first priority information and/or the second priority information.

Optionally, in the embodiment of the present disclosure, the network slice information includes the first priority information, and the acquiring unit 440 acquiring the first priority information includes:
   acquiring the first priority information from the network slice information.

Optionally, in the embodiment of the present disclosure, the first device is a terminal device, the second device is a network device, and the communicating unit 430 is configured to:
   access the network device according to the target network slice; and/or reside in a cell to which the target network slice belongs according to the target network slice.

Optionally, in the embodiment of the present disclosure, the first device is a network device, the second device is a terminal device, and the communicating unit 430 is configured to:

perform resource configuration for the terminal device according to the target network slice; and/or handover or redirect the terminal device to a cell to which the target network slice belongs according to the target network slice.

Optionally, in the embodiment of the present disclosure, the communicating unit 430 residing in a cell to which the target network slice belongs according to the target network slice includes:

residing in a cell to which the target network slice belongs according to the target network slice, when determining that a network slice with highest priority from network slices supported by the network device and processed by the network device and a network slice with highest priority from network slices supported by the terminal device and processed by the terminal device are identical.

Optionally, in the embodiment of the present disclosure, the network slice information further includes a probability of the terminal device to access each of the multiple network slices, the communication unit 440 accessing the network device according to the target network slice includes:

accessing the network device according to a probability of a service of the terminal device to access the target network slice.

Optionally, in the embodiment of the present disclosure, the first device is an access network device, the second device is a terminal device, and the acquiring unit 440 acquiring first priority information includes:

receiving the first priority information authenticated by a core network device and sent by the terminal device.

Optionally, in the embodiment of the present disclosure, the first device is an access network device and the second device is a terminal device, and the device further includes:

a sending unit 450, configured to send the first priority information to a core network device when determining that the first priority information needs to be authenticated;

the receiving unit 410 is further configured to:

receive an acknowledgement message of the priority information sent by the core network device.

Therefore, in the wireless communication device in the embodiment of the present disclosure, it enables the terminal to select the most suitable access point for access by notifying information of different network slices of the peer end and the processing priority for different network slices. In addition, it enables the network to learn about the slice priority of the terminal when supporting multiple slice functions, so as to better match the terminal residing, access and handing-over behavior, and improve experience of end users.

It should be understood that the wireless communication device 400 according to an embodiment of the present disclosure may correspond to the first device in the method embodiment of the present disclosure, and the above and other operations and/or functions of respective units in the device 400 are respectively implemented to implement corresponding flow of the method in FIG. 2 to FIG. 4, which will not be repeated herein for brevity.

Figure 6:
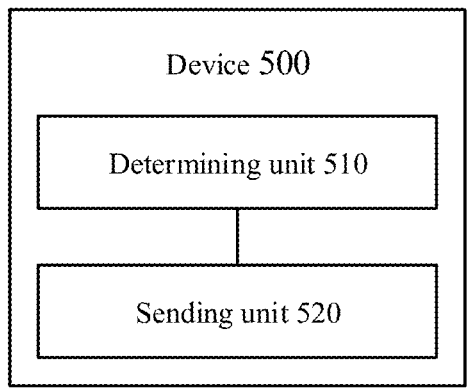
FIG. 6 shows another schematic block diagram of a wireless communication device in accordance with an embodiment of the present disclosure.

FIG. 6 shows a wireless communication device 500 in accordance with an embodiment of the present disclosure. As shown in FIG. 6, the device is a second device, and the device 500 includes:

a determining unit 510, configured to determine network slice information, wherein the network slice information is configured to indicate multiple network slices;

a sending unit 520, configured to send the network slice information to a first device.

Therefore, in the wireless communication device in the embodiments of the present invention, by learning about network slice information of a peer end, the condition of multiple network slices sent by the peer end can be learnt about; and accordingly, a target network slice can be better selected to perform wireless communication, so as to improve the quality of the wireless communication.

Optionally, in the embodiment of the present disclosure, the sending unit 520 is further configured to:

send first priority information to the first device, wherein the first priority information is configured to indicate a sequence of processing network slices supported by the second device from the multiple network slices by the second device.

Optionally, in the embodiment of the present disclosure, the second device is a terminal device, the first device is a network device, and the device further includes:

an updating unit S30, configured to update the first priority information according to a service requirement of the terminal device.

Optionally, in the embodiment of the present disclosure, the second device is a terminal device and the first device is an access network device, and the sending unit 520 sending first priority information to the first device includes:

sending the first priority information authenticated by a core network device to the access network device.

Therefore, in the wireless communication device in the embodiment of the present disclosure, it enables the terminal to select the most suitable access point for access by notifying information of different network slices of the peer end and the processing priority for different network slices. In addition, it enables the network to learn about the slice priority of the terminal when supporting multiple slice functions, so as to better match the terminal residing, access and handing-over behavior, and improve experience of end users.

It should be understood that the wireless communication device 500 according to an embodiment of the present disclosure may correspond to the second device in the method embodiment of the present disclosure, and the above and other operations and/or functions of respective units in the device 500 are respectively implemented to implement corresponding flow of the method in FIG. 2 to FIG. 4, which will not be repeated herein for brevity.

Figure 7:
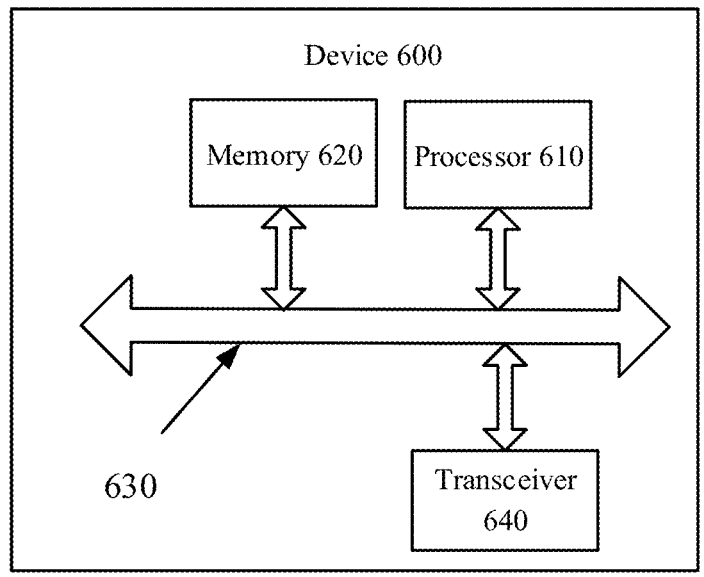
FIG. 7 shows yet another schematic block diagram of a wireless communication device in accordance with an embodiment of the present disclosure.

As shown in FIG. 7, an embodiment of the present disclosure further provides a wireless communication device 600. The device 600 is a first device. The device 600 includes a processor 610, a memory 620, a bus system 630, and a transceiver 640. The processor 610, the memory 620, and the transceiver 640 are connected by the bus system 630. The memory 620 is configured to store instructions. The processor 610 is used for executing the instructions stored by the memory 620, to control the transceiver 640 to send a signal. The processor 610 is configured to: receive network slice information sent by a second device, the network slice information being configured to indicate multiple network slices; determine a target network slice from the multiple network slices according to the network slice information, the target network slice including at least one network slice supported by the first device; and perform wireless communication according to the target network slice.

Therefore, in the wireless communication device in the embodiments of the present invention, by learning about network slice information of a peer end, the condition of multiple network slices sent by the peer end can be learnt about; and accordingly, a target network slice can be better selected to perform wireless communication, so as to improve the quality of the wireless communication.

It should be understood that, in the embodiment of the present disclosure, the processor 610 may be a central processing unit ("CPU"), and the processor 610 may also be other general-purpose processors, digital signal processors (DSPs), application specific integrated circuits (ASICs), field programmable gate arrays (FPGAs) or other programmable logic devices, discrete gates or transistor logic devices, discrete hardware components, and the like. The general purpose processor may be a microprocessor or the processor or any conventional processor or the like.

The memory 620 can include read only memory and random access memory, and provides instructions and data to the processor 610. A portion of the memory 620 can also include a non-volatile random access memory. For example, the memory 620 can also store information of the device type.

The bus system 630 may include a power bus, a control bus, a status signal bus, and the like in addition to the data bus. However, for clarity of description, various buses are labeled as bus system 630 in the figure.

In the implementation process, each step of the above method may be completed by an integrated logic circuit of hardware in the processor 610 or an instruction in a form of software. The steps of the method disclosed in the embodiments of the present disclosure may be directly implemented as being performed by a hardware processor, or may be performed by a combination of hardware and software modules in the processor. The software module can be located in a conventional storage medium such as random access memory, flash memory, read only memory, programmable read only memory or electrically erasable programmable memory, register, and the like. The storage medium is located in the memory 620, and the processor 610 reads the information in the memory 620 and completes the steps of the above method in combination with its hardware. To avoid repetition, it will not be described in detail herein.

It should be understood that the wireless communication device 600 according to an embodiment of the present disclosure may correspond to the first device and device 400 in the method embodiment of the present disclosure, and may correspond to the first device in the method according to the embodiment of the present disclosure, and the above and other operations and/or functions of respective units in the device 600 are respectively implemented to implement corresponding flow of the method in FIG. 2 to FIG. 4, which will not be repeated herein for brevity.

Figure 8:
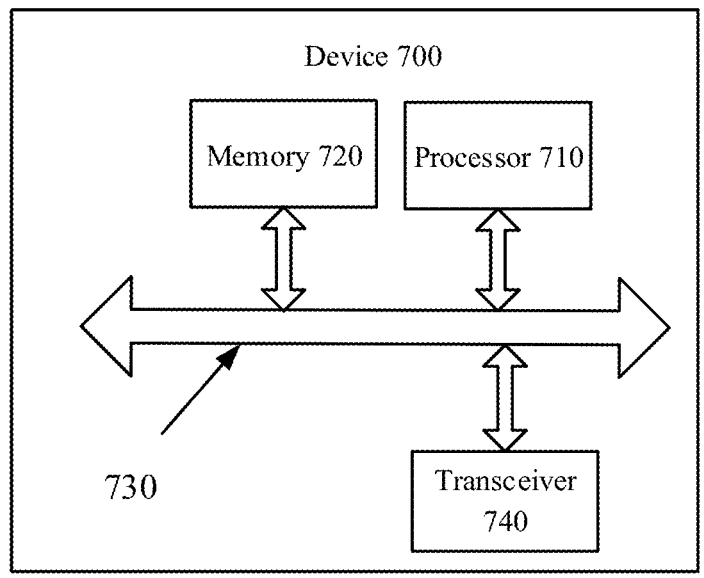
FIG. 8 shows yet another schematic block diagram of a wireless communication device in accordance with an embodiment of the present disclosure.

As shown in FIG. 8, an embodiment of the present disclosure further provides a wireless communication device 700. The device 700 is a first device. The device 700 includes a processor 710, a memory 720, a bus system 730, and a transceiver 740. The processor 710, the memory 720, and the transceiver 740 are connected by the bus system 730. The memory 720 is configured to store instructions. The processor 710 is used for executing the instructions stored by the memory 720, to control the transceiver 740 to send a signal. The processor 710 is configured to: determine network slice information, wherein the network slice information is configured to indicate multiple network slices; send the network slice information to a first device.

Therefore, in the wireless communication device in the embodiments of the present invention, by learning about network slice information of a peer end, the condition of multiple network slices sent by the peer end can be learnt about; and accordingly, a target network slice can be better selected to perform wireless communication, so as to improve the quality of the wireless communication.

It should be understood that, in the embodiment of the present disclosure, the processor 710 may be a central processing unit ("CPU"), and the processor 710 may also be other general-purpose processors, digital signal processors (DSPs), application specific integrated circuits (ASICs), field programmable gate arrays (FPGAs) or other programmable logic devices, discrete gates or transistor logic devices, discrete hardware components, and the like. The general purpose processor may be a microprocessor or the processor or any conventional processor or the like.

The memory 720 can include read only memory and random access memory, and provides instructions and data to the processor 710. A portion of the memory 720 can also include a non-volatile random access memory. For example, the memory 720 can also store information of the device type.

The bus system 730 may include a power bus, a control bus, a status signal bus, and the like in addition to the data bus. However, for clarity of description, various buses are labeled as bus system 730 in the figure.

In the implementation process, each step of the above method may be completed by an integrated logic circuit of hardware in the processor 710 or an instruction in a form of software. The steps of the method disclosed in the embodiments of the present disclosure may be directly implemented as being performed by a hardware processor, or may be performed by a combination of hardware and software modules in the processor. The software module can be located in a conventional storage medium such as random access memory, flash memory, read only memory, programmable read only memory or electrically erasable programmable memory, register, and the like. The storage medium is located in the memory 720, and the processor 710 reads the information in the memory 720 and completes the steps of the above method in combination with its hardware. To avoid repetition, it will not be described in detail herein.

It should be understood that the wireless communication device 700 according to an embodiment of the present disclosure may correspond to the second device and device 500 in the method embodiment of the present disclosure, and may correspond to the second device in the method according to the embodiment of the present disclosure, and the above and other operations and/or functions of respective units in the device 700 are respectively implemented to implement corresponding flow of the method in FIG. 2 to FIG. 4, which will not be repeated herein for brevity.

It should be understood that in the embodiment of the present disclosure, "B corresponding to A" means that B is associated with A, and B can be determined according to A. However, it should also be understood that determining B according to A does not mean that B is determined solely from A, and that B can also be determined based on A and/or other information.

It should be understood that, the term "and/or" in this context is merely an association describing the associated objects, indicating that there may be three relationships, for example, A and/or B, which may indicate that A exists separately, both A and B exist, and B exists separately. In addition, the character "/" herein generally indicates an "or" relationship of contextual objects.

It should be understood that, in various embodiments of the present disclosure, the sequence numbers of the above processes do not mean the order of execution, and the order of execution of each process should be determined by its function and internal logic, and should not be taken to constitute any limitation to the implementation process of embodiments of the present disclosure.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods for implementing the described functions for each particular application, but such implementation should not be considered to go beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it should be understood that the disclosed systems, apparatuses, and methods may be implemented in other manners. For example, the apparatus embodiments described above are merely illustrative. For example, the division of the unit is only a logical function division. In actual implementation, there may be another division manner. For example, a plurality of units or components may be combined or integrated into another system, or some features can be ignored or not executed. In addition, the coupling or direct coupling or communication connection shown or discussed may be an indirect coupling or communication connection through some interfaces, apparatuses or units, which may be electrical, mechanical or otherwise.

The units described as separate components may or may not be physically separated, and the components displayed as units may or may not be physical units. That is, they may be located in one place, or may be distributed to multiple network units. Some or all of the units may be selected according to actual needs to achieve the purpose of the technical solution of the embodiment.

In addition, each functional unit in each embodiment of the present disclosure may be integrated into one processing module, or each unit may exist physically separately, or two or more units may be integrated into one unit.

The functions may be stored in a computer readable storage medium if implemented in the form of a software functional unit and sold or used as a standalone product. Based on such understanding, the technical solution of the present disclosure which is essential or a part contributes to the prior art, or a part of the technical solution, may be embodied in the form of a software product, which is stored in a storage medium, including instructions to cause a computer device (which may be a personal computer, server, or network device, etc.) to perform all or part of the steps of the methods described in various embodiments of the present disclosure. The foregoing storage medium includes: a U disk, a mobile hard disk, a Read-Only Memory (ROM), a Random Access Memory (RAM), a disk, or an optical disk or other media that can store program codes.

The above is only the specific embodiment of the present disclosure, but the scope of the present disclosure is not limited thereto, and any person skilled in the art can easily think of changes or substitutions within the technical scope of the present disclosure and they should be covered by the scope of the present disclosure. Therefore, the scope of the disclosure should be determined by the scope of the claim.

What is claimed is:

1. A wireless communication method, comprising:
   a first device receiving network slice information sent by a second device, wherein the network slice information is configured to indicate multiple network slices supported by the second device;
   the first device determining a target network slice from the multiple network slices according to the network slice information, the target network slice comprising at least one network slice supported by the first device; and
   the first device performing wireless communication according to the target network slice;
   wherein the first device is a network device and the second device is a terminal device, and
   wherein the first device performing wireless communication according to the target network slice comprises at least one of:
   the network device performing resource configuration for the terminal device according to the target network slice; and
   the network device triggering handover or redirection of the terminal device to a cell having the target network slice according to the target network slice.

2. The method according to claim 1, wherein the method further comprises:
   the first device acquiring at least one of first priority information and second priority information, wherein the first priority information is configured to indicate a sequence of processing network slices supported by the second device, the second priority information is configured to indicate a sequence of processing network slices supported by the first device;
   wherein the first device determining the target network slice from the multiple network slices according to the network slice information comprises:
   the first device determining the target network slice from the multiple network slices according to at least one of the first priority information and the second priority information.

3. The method according to claim 2, wherein the network slice information comprises the first priority information, and the first device acquiring the first priority information comprises:
   the first device acquiring the first priority information from the network slice information.

4. The method according to claim 2, wherein the first device acquiring at least one of the first priority information and the second priority information comprises:
   the first device acquiring at least one of the first priority information and the second priority information during an initiation of a handover.

5. The method according to claim 2, wherein the first device is an access network device, and the first device acquiring the first priority information comprises:
   the access network device receiving the first priority information authenticated by a core network device and sent by the terminal device.

6. The method according to claim 2, wherein the first device is an access network device, the method further comprises:
the access network device sending the first priority information to a core network device when determining that the first priority information needs to be authenticated; and
the access network device receiving an acknowledgement message of the priority information sent by the core network device.

7. A wireless communication device, wherein the device is a first device, and the device comprises a memory, a processor, a transceiver, and a communication interface,
wherein the memory is stored with instructions, which when executing on the processor, causes the wireless communication device to:
receive, by the transceiver, network slice information sent by a second device, wherein the network slice information is configured to indicate multiple network slices supported by the second device;
determine, by the processor, a target network slice from the multiple network slices according to the network slice information, the target network slice comprising at least one network slice supported by the first device; and
perform wireless communication, by the communication interface, according to the target network slice;
wherein the first device is a network device and the second device is a terminal device, and
wherein the wireless communication device is further caused to perform at least one of:
performing resource configuration for the terminal device according to the target network slice; and
triggering handover or redirection of the terminal device to a cell having the target network slice according to the target network slice.

8. The device according to claim 7, wherein the wireless communication device is further caused to:
acquire, by the transceiver, at least one of first priority information and second priority information, wherein the first priority information is configured to indicate a sequence of processing network slices supported by the second device, the second priority information is configured to indicate a sequence of processing network slices supported by the first device; and
determine, by the processor, the target network slice from the multiple network slices according to at least one of the first priority information and the second priority information.

9. The device according to claim 8, wherein the network slice information comprises the first priority information, and the wireless communication device is further caused to:
acquire the first device acquiring the first priority information from the network slice information.

10. The device according to claim 8, wherein the wireless communication device is further caused to:
acquire at least one of the first priority information and the second priority information during an initiation of a handover.

11. The device according to claim 8, wherein the first device is an access network device which is further caused to:
receive the first priority information authenticated by a core network device and sent by the terminal device.

12. The device according to claim 8, wherein the first device is an access network device which is further caused to:
send the first priority information to a core network device when determining that the first priority information needs to be authenticated; and
receive an acknowledgement message of the priority information sent by the core network device.

* * * * *